July 5, 1966 J. W. McPHERSON 3,259,835
VARIABLE-IMPEDANCE ELECTRIC CIRCUITS
Filed Nov. 20, 1962
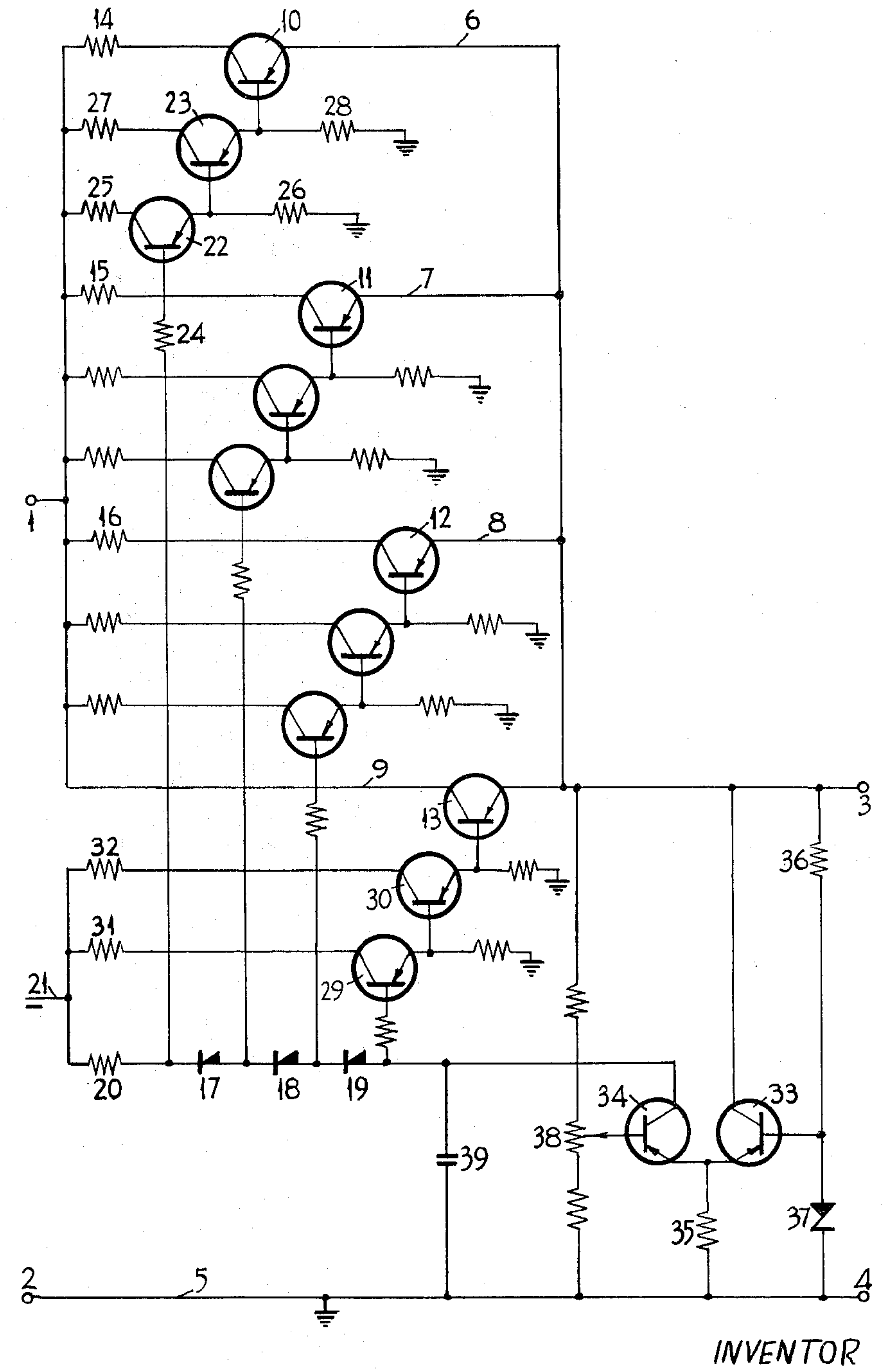
INVENTOR
John Wemyss McPherson
By Kirschstein, Kirschstein & Ottinger
ATTORNEYS United States Patent Office 3,259,835
Patented July 5, 1966

3,259,835

VARIABLE-IMPEDANCE ELECTRIC CIRCUITS

John Wemyss McPherson, Hayes, Middlesex, England, assignor to The General Electric Company Limited, London, England Filed Nov. 20, 1962, Ser. No. 238,978
Claims priority, application Great Britain, Nov. 24, 1961, 42,210/61; Jan. 17, 1962, 1,791/62
9 Claims. (Cl. 323—22)

This invention relates to variable-impedance electric circuits. More particularly, but not exclusively, this invention relates to variable-impedance circuits for use as impedance elements in direct current voltage stabilizer circuits.

According to the present invention, a variable-impedance electric circuit comprise an input terminal and an output terminal, a plurality of paths connected in parallel between the input and output terminals, each of the parallel-connected paths including the path between the first and second further electrodes of a transistor having a control electrode and first and second further electrodes, and some at least of the parallel-connected paths also including further resistance, and a potential divider having a plurality of tapping points equal in number to the number of parallel-connected paths, the tapping points being connected to the control electrodes of the transistors one to one, the arrangement being such that the impedance of the circuit measured between the input and output terminals can be varied over a range of values by varying the voltage applied to the potential divider such that the biases applied from the tapping points to the control electrodes of the transistors are varied.

Preferably some at least of the connections between a tapping point on the potential divider and the control electrode of the associated transistor include a network which presents a high resistance to said tapping point and which is arranged to supply a current to the control electrode of the associated transistor in dependence upon the potential at said tapping point, said current being derived from a source other than said potential divider.

Preferably the transistors are junction transistors each having base, collector and emitter electrodes, and each said network also comprises one or more junction transistors each having base, collector and emitter electrodes, this transistor or each of these transistors comprised in each said network being arranged in emitter follower configuration.

The potential divider may be formed by a series-connected chain of similarly-poled rectifier elements, the voltage applied to the potential divider being such as to bias the rectifier elements in their forward conducting direction. In this case, the tapping points may be situated at the ends of the chain and at the junctions between individual rectifier elements in the chain.

It is preferable for the arrangement to be such that, numbering the parallel-connected paths in sequence from 1 to $n$, the sequence of numbering corresponding to the sequence in which the base electrodes of the transistors are connected to the chain of rectifier elements, the resistance of the collector-emitter path of the transistor in the $p$th path ($p$ having any value from 1 to $n$) should only be controlled to have a value intermediate between the values corresponding to the transistor being saturated and the transistor being non-conducting when the transistors in the first to $(p-1)$th paths are bottomed and the transistors in the $(p+1)$th to $n$th paths are non-conducting.

The number of parallel-connected paths and the values of said further resistances for a particular application may be determined as set out in general terms in the description which follows.

The variable-impedance circuit may form the impedance element of a direct current voltage stabilizer circuit.

A variable-impedance electric circuit in accordance with the present invention will now be described by way of example, with reference to the accompanying drawing. The drawing shows the variable impedance circuit and, in simplified form, a direct current voltage stabilizer circuit of which the variable-impedance circuit forms the series impedance element.

Although to be described as forming the series impedance element of a voltage stabilizer circuit, the utility of the variable-impedance element is not limited to this application.

The single figure shows a direct current voltage stabilizer circuit.

Referring now to the drawing, the voltage stabilizer circuit has input terminals 1 and 2, and output terminals 3 and 4, the terminals 2 and 4 being directly connected by an earth line 5. During operation an unstabilized voltage, which may vary in the range 11 to 20 volts, is supplied between the terminals 1 and 2, and the stabilizer circuit is required to operate to supply a stabilized direct current voltage of 10 volts between the terminals 3 and 4.

The variable-impedance circuit comprises four paths, 6, 7, 8 and 9 connected in parallel between the terminals 1 and 3, the paths 6, 7, 8 and 9 including the collector-emitter paths of four similar p-n-p junction transistors 10, 11, 12 and 13, respectively. The paths 6, 7 and 8 also include resistors 14, 15 and 16, respectively.

The variable-impedence circuit also includes a potential divider formed by a chain of three similar silicon diodes 17, 18 and 19, connected in series. The anode terminals of the diodes 17, 18 and 19 are connected to the base electrodes of the transistors 11, 12 and 13, respectively, by way of emitter follower networks. The cathode terminal of the diode 17 is connected to the base electrode of the transistor 10 by way of an emitter follower network, and by way of a resistor 20 to a negative supply line 21. These emitter-follower networks operate when necessary to supply the base currents for the transistors 10, 11, 12 and 13.

Considering the emitter follower network associated with the transistor 10, this network comprises two p-n-p junction transistors 22 and 23. The base electrode of the transistor 22 is connected by way of a resistor 24 of large value to the cathode terminal of the rectifier element 17, its collector electrode is connected by way of a resistor 25 of moderate value to the terminal 1, and its emitter electrode is connected to earth by way of a resistor 26 of large value and to the base electrode of the transistor 23. The collector electrode of the transistor 23 is connected by way of a resistor 27 of comparatively low value to the terminal 1 and its emitter electrode is connected to earth by way of a resistor 28 of large value and to the base electrode of the transistor 10.

In the case of transistors 11 and 12, the emitter follower network is similar to that described for the transistor 10.

In the case of the transistor 13 there is a slight difference. This is because the times when a comparatively large base current is required for the transistor 13 coincide with times when the resistance, and hence the voltage drop, between the terminals 1 and 3 is low. At these times the required base current for the transistor 13 cannot be derived from the terminal 1. For this reason the collector electrodes of transistors 29 and 30 in the emitter follower network associated with the transistor 13 are connected by way of resistors 31 and 32 respectively to the supply line 21, instead of to the terminal 1. The supply line 21 is maintained at a potential about 10 volts negative with respect to the terminal 3. Apart from this, the emitter follower network associated with the transistor 13 is similar to those previously described.

The stabilizer circuit also includes an error amplifier which comprises two p-n-p junction transistors 33 and 34, the emitter electrodes of which are connected to the earth line 5 by way of a common resistor 35. The base electrode of the transistor 33 is connected to the terminal 3 by way of a resistor 36 and to the earth line 5 by way of a Zener diode 37, whilst its collector electrode is connected to the terminal 3. The base electrode of the transistor 34 is connected to a tapping point on a potentiometer 38 which is connected between the terminal 3 and the earth line 5, whilst its collector electrode is connected to the earth line 5 by way of a capacitor 39 and to the anode terminal of the diode 19.

During operation, the error amplifier amplifies the error signal derived from the difference between the reverse breakdown voltage of the Zener diode 37 and the voltage at the tapping point on the potentiometer 38. This results in the voltage at the anode terminal of the diode 19 being varied. The arrangement is such that if the voltage between the terminals 3 and 4 rises above the required stabilized value, the impedance of the variable-impedance element increases, and vice versa, so that the voltage is maintained at the required stabilized value.

Considering the operation of the variable-impedance element in more detail. The resistance of the collector-emitter path of the transistor 10 will have a range from near zero to near infinity, for a range of base to emitter voltage of zero to minus one volt. If therefore the transistor 10 has any intermediate value of resistance its base to emitter voltage must lie within the range zero to minus one volt.

The diode 17 is biased in its forward direction, and the voltage drop across it is therefore approximately one volt. This means that the base to emitter voltage of the transistor 11 must be approximately one volt more positive than the base to emitter voltage of the transistor 10. The resistance of the collector-emitter path of the transistor 11 will, therefore, be near infinity, and the same applies to transistors 12 and 13.

In these circumstances therefore the impedance of the variable-impedance element is determined almost solely by the value of the resistor 14 and of the resistance of the collector-emitter path of the transistor 10.

If, on the other hand, the collector-emitter path of the transistor 11 has an intermediate value of resistance, its base to emitter voltage must lie within the range zero to minus one volt. This means that the base to emitter voltage of the transistor 10 must lie within the range minus one to minus two volts, so that the transistor 10 will be saturated. Similarly, if the collector-emitter path of the transistor 12 has an intermediate value of resistance, the transistors 10 and 11 will be saturated, and if the collector-emitter path of the transistor 13 has an intermediate value of resistance, the transistors 10, 11 and 12 will be saturated. The impedance of the variable-impedance element will then depend almost solely upon the resistance of the collector-emitter path of the transistor 13 shunted by the resistors 14, 15 and 16.

The impedance of the variable-impedance element can therefore be varied in a range between a very large value and a very small value by controlling the voltage at the anode terminal of the diode 19.

As previously indicated, the purpose of the emitter follower networks associated with the transistors 10, 11, 12 and 13 is to supply the base currents required by the transistors 10, 11, 12 and 13. These base currents are therefore derived from the terminal 1 and the supply line 21. If the emitter follower networks were not provided, these base currents would be derived by way of the diodes 17, 18 and 19, and the resistor 20. This may, in some circumstances, be unsatisfactory, as clearly only a limited current can be drawn in this way.

The number of parallel-connected paths required in the variable-impedance element, and the optimum values of the resistors in the parallel-connected paths, will now be considered in the general and in a particular case.

For the general case it is assumed that the number of parallel-connected paths is $n$, the paths being referred to as the first, second . . . $n$th path reading from the top as shown in the drawing. It is also assumed that the maximum voltage which it may be required to drop across the variable-impedance element is $V_{max}$, the maximum current which it may be required should flow in the variable-impedance element is $I_{max}$, and the maximum power which can be dissipated in any one of the transistors used in the paths is P.

The steps in the design of a suitable variable-impedance element are then as follows:

(a) If there is a voltage drop $V_{max}$ across the variable-impedance element, then the condition for maximum power dissipation in the transistor in the first path is obtained when the resistance of the collector-emitter path of the transistor in the first path is equal to the value (R) of the resistor in the first path. In this case the dissipation in the transistor in the first path will be:

$$\frac{V^2_{max.}}{4R}$$

and this must equal P, so that:

$$P=\frac{V^2_{max.}}{4R} \quad (1)$$

(b) Check whether:

$$\frac{V_{max.}}{R}=I_{max.} \quad (2)$$

(c) If the condition 2 is met, then $n$ will be equal to two. In this case the resistor in the first branch will have a value R and there will be no resistor in the second branch.

(d) If the condition 2 is not met, a second path, identical with the first path, must be added.

(e) Check whether:

$$\frac{2V_{max.}}{R}=I_{max.} \quad (3)$$

(f) If the condition 3 is met only the first and second paths will be identical.

(g) If the condition 3 is not met further identical paths must be added until the condition:

$$\frac{mV_{max.}}{R}=I_{max.} \quad (4)$$

where $m$ is the number of identical paths, is met.

(h) When the resistance of the collector-emitter path of the transistor in each of the paths so far defined is substantially zero, the effective resistance shunting the $(m+1)$th path is $R/m$.

(i) The $(m+1)$th path can now be defined, as it can be shown that the condition for maximum power dissipation in the transistor in the $(m+1)$th path, will be obtained when the collector-emitter resistance of that transistor is:

$$R/m+R_{m+1}$$

where $R_{m+1}$ is the value of the resistor in the $(m+1)$th path.

It may then be shown that:

$$R_{m+1}=\frac{I^2_{max.}(R_{T_m})^2}{4P}-R_{T_m} \quad (5)$$

where $R_{T_m}$ is the effective resistance of all the previously considered paths in parallel assuming the transistors in those paths are saturated.

For the $(m+1)$th path, therefore $$R_T=R_{T_m}\leq R/m$$

(j) Condition 5 is then used to define the $(m+1)$th to $(n-1)$th paths. The $n$th path, in which there is no resistor, is defined when:

$$I^2_{max.}(R_{T(n-1)})=4P(R_{T(n-1)}) \quad (6)$$

A particular case will now be considered. It is assumed that a variable-impedance element is required for a voltage stabilizer and that $V_{max}$ is 10 volts, $I_{max}$ is 10 amps and P is 12.5 watts. The variable impedance element could therefore, in accordance with previously known practice, be formed by eight parallel-connected transistors. In such a case the maximum power dissipation in the transistors would total 100 watts, and a heat sink of this capacity would therefore be required to avoid damage to the transistors.

A variable-impedance element in accordance with the present invention is designed as follows. Step (a) gives a value of 2 ohms for the resistor in the first path. The condition 2 is not then satisfied, so a second path identical with the first is added. The condition 4 is now satisfied. Step (i) gives a value of 1 ohm for the resistor in the third path, and step (j) a value of zero for the resistor in the fourth path.

In this case it can be shown that for any value of power dissipation in the variable-impedance element the greater part of the power is dissipated in the resistors in the various paths, the resistors being, of course, considerably less susceptible to thermal damage than the transistors.

In the particular embodiment of the variable-impedance circuit described, the maximum current flowing between the terminals 1 and 3 is 10 amps and the maximum voltage drop is 10 volts. The maximum power dissipated in the circuit is, therefore, 100 watts; but at no time is more than 12.5 watts dissipated in any one of the transistors 10, 11, 12 or 13. Furthermore, the conditions which result in maximum power dissipation are not the same for each of the transistors 10, 11, 12 and 13, so they may all be mounted on the same heat sink, the heat sink having a rating of, say 15 watts.

I claim:

1. A variable-impedance electric circuit comprising an input terminal, an output terminal, a plurality of paths, means to connect said paths in parallel between the input and output terminals, a plurality of transistors equal in number to the number of said paths, each transistor having first and second electrodes and a control electrode, each one of said paths including the path between said first and second electrodes of a respective one of said transistors, at least one of said plurality of paths including a resistance connected directly in series with the respective transistor, a potential dividing network, the control electrodes of said transistors each being connected to a respective tapping point of the potential dividing network, and means for applying a variable voltage across the potential dividing network so as to vary the impedance of the circuit measured between said input and output terminals.

2. A circuit according to claim 1 wherein at least one of the connections between tapping points on the potential divider and the control electrodes of the associated transistors comprises amplifying circuit means which presents a high resistance to the tapping point to which said amplifying means is connected and supplies a current to the control electrode of the associated transistor in dependence upon the potential of said tapping point.

3. A circuit according to claim 2 wherein the transistors are junction transistors each having base, collector and emitter electrodes, and each said amplifying circuit means also comprises at least one junction transistor having base, collector and emitter electrodes, connected in emitter follower configuration.

4. A circuit according to claim 1 wherein said potential dividing network comprises a series-connected chain of nonlinear elements having voltage-current characteristics such that the voltage drop across them is substantially constant with changing current for a range of current values, said control electrodes of the transistors being connected to said nonlinear elements so that the potential differences between said control electrodes are substantially constant for said range of current values.

5. A circuit according to claim 4 wherein said potential dividing network includes a linear resistance connected in series with said chain of nonlinear elements.

6. A circuit according to claim 5 wherein said nonlinear elements comprise a chain of rectifier elements biased in their forward conducting direction.

7. A circuit according to claim 6 wherein the arrangement is such that, numbering the parallel-connected paths in sequence from 1 to $n$, the sequence of numbering corresponding to the sequence in which the base electrodes of the transistors are connected to the chain of rectifier elements, the resistance of the collector-emitter path of the transistor in the $p$th path ($p$ having any value from 1 to $n$) is only controlled to have a value intermediate between the values corresponding to the transistor being saturated and the transistor being nonconducting when the transistors in the first to $(p-1)$th paths are saturated and the transistors in the $(p+1)$th to $n$th paths are nonconducting.

8. A circuit in accordance with claim 7 and comprising $m$ of said parallel paths in each of which the value of said further resistance is R which is equal to $$\frac{V^2_{max}}{4P}$$

where $V_{max}$ is the maximum voltage to be dropped across the circuit, P is the power rating of each transistor and $m$ is equal to $$\frac{I_{max}R}{V_{max}}$$

and further comprising a number $(n-m)$ of said parallel paths in which said further resistance decreases in value progressively from a value $R(1-1/m)$ to zero in accordance with the formula $$R_{(m+q)}=\frac{[R_{T(m+q-1)}]^2m^2}{R}-R_{T(m+q-1)}$$

where $q$ is any integer from 1 to $(n-m)$, $n$ is the total number of said parallel paths, $R_{T(\ )}$ is the effective total further resistance of all the parallel paths as far as that within the brackets of the suffix.

9. A direct-current voltage stabilizer circuit having a series impedance element formed by a circuit according to claim 1, wherein the means for applying a variable voltage across the potential dividing network comprises circuit means connected to said output terminal.

References Cited by the Examiner

Gordy, E. and Hasenpusch, P.: Constant Current Coupled Transistor Power Supply, Electronics, pp. 60–61, October 9, 1959.

LLOYD McCOLLUM, *Primary Examiner.*

H. B. KATZ, *Assistant Examiner.*